United States Patent

Gable et al.

[11] 4,255,742
[45] Mar. 10, 1981

[54] DATA COMMUNICATION CODE

[75] Inventors: Melvin G. Gable, Ypsilanti; Richard H. Sherman, Plymouth, both of Mich.

[73] Assignee: Ford Motor Company, Dearborn, Mich.

[21] Appl. No.: 46,517

[22] Filed: Jun. 7, 1979

[51] Int. Cl.$^2$ ............................................ H03K 13/24
[52] U.S. Cl. .............................. 340/347 DD; 375/19
[58] Field of Search ................ 178/113; 340/347 DD; 375/19

[56] References Cited

U.S. PATENT DOCUMENTS

| | | | |
|---|---|---|---|
| 2,700,696 | 1/1955 | Barker | 340/347 DD |
| 3,842,401 | 10/1974 | Smith | 375/19 |

Primary Examiner—Charles D. Miller
Attorney, Agent, or Firm—Peter Abolins; Clifford L. Sadler

[57] ABSTRACT

An encoder of a transmitter converts digital data or analog signal information into an encoded sequence or waveform required by a communication channel. If a plurality of transmitters are to share a common channel or medium, then the correlation properties of the encoded signal are important. The encoding apparatus should employ a code which is not very susceptible to noise, yet will permit the detection of multiple transmissions of similar spectrum signals. The apparatus disclosed in this specification is concerned with a binary digital information encoder whose input is either a "zero" or "one" state. The encoder generates a ternary code sequence for encoding one binary input state with the sequence $+1,+1,0,0,-1,-1$ and the other binary input state with the sequence represented by $+1,0,+1,-1,0,-1$.

2 Claims, 2 Drawing Figures

ENCODED "1" DATA BIT MODULATION

+1,+1 | 0,0 | -1,-1 | CODE SEQUENCE

ENCODED "0" DATA BIT MODULATION

+1,0 | +1,-1 | 0,-1 | CODE SEQUENCE

ENCODED "1" DATA BIT MODULATION

CODE SEQUENCE: +1,+1 | 0,0 | -1,-1

ENCODED "0" DATA BIT MODULATION

CODE SEQUENCE: +1,0 | +1,-1 | 0,-1

DATA COMMUNICATION CODE

BACKGROUND OF THE INVENTION (1) Field of the Invention

The present invention relates to the encoding means of a digital data communication transmitter.

(2) Prior Art

With respect to the prior art, encoding is the process by which digital data bits or analog signal information is transmitted over a communication channel. The use of code redundancy will increase the information certainty of the receiving system. Codes have most often been employed to satisfy the demands of the communication system. Codes are used to a great advantage in spread spectrum systems. A spread spectrum system is one that employs a great deal more bandwidth in transmitting its information than would normally be required. Error detecting and correcting codes for instance are often employed in spread spectrum systems on the data channel to protect the information from interference induced errors. Performing a correlation process in a spread spectrum receiver acts to overcome interference and thus to improve the decoder performance. Spread spectrum systems of the direct sequence type are very similar to pulse code modulation (PCM) systems except the usual PCM codes are replaced by very long code sequences. There are various PCM codes which are described for example in "Digital Computer Technology and Design" Vol. II, Pages 12.26–12.27 by W. H. Ware, John Wiley and Sons, 1963.

A number of encoding schemes can be used for transmission. The desirable features of the code employed are as follows:

1. It should be possible to derive timing information from the encoded waveform.
2. The process of decoding or demodulation should result in a carrier detect signal.
3. The signal element should have state changes to prevent repetitions of the same code and information states (i.e., strings) from producing low frequency signal spectrum components.
4. The average value of the signal should be zero to facilitate A.C. coupling.
5. The total power transmitted for an encoded "zero" and "one" should be equal so that the transmitted energy is independent of string sequence form.
6. If the encoded signal is waveform integrated to reduce high frequency spectral components then conditions 4 and 5 must be satisfied.

The above conditions place strict constraints on the encoder design. If a wideband data channel is available on the communication medium, then spread spectrum techniques can be employed. The use of longer code sequences, than the usual pulse code modulation (PCM) codes, can be used effectively to produce an encoded signal to meet the above constraints. If a plurality of transmitters are to share a common communication channel, then the detection of multiple transmission of similar spectrum signals is important. This places another constrait on the encoder. The out-of-phase correlation properties of the encoded signal are important. The correlation of "zero" and "one" canonical code sequences should produce a collision detectable signal. Also the correlation of multiple signals formed by any combination of "zero" and "one" canonical code sequences should be detectable. Nevertheless, the code sequences generated by the encoder should be able to protect the information from noise interference induced errors. These are some of the problems this invention overcomes.

SUMMARY OF THE INVENTION

In accordance with an embodiment of this invention, the encoder apparatus of the transmitter encodes binary digital information. The input to the encoder is either one of two possible states called a "zero" or "one". The encoder generates a ternary output signal which is one of three possible states represented by "+1", "0" and "−1". As a function of time, the encoder processes the input state and generates a ternary code sequence as an output. The output code sequence for one binary input state is represented by the sequence +1, +1, 0, 0, −1, −1 and the other binary input state with the representative sequence +1, 0, +1, −1, 0, −1.

DESCRIPTION OF THE SPECIFIC EMBODIMENTS

Figure 1:
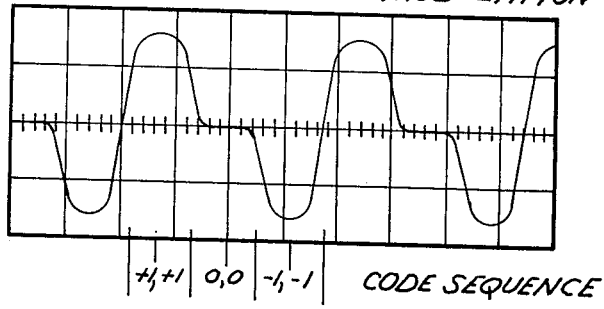
FIG. 1 is a signal waveform which illustrates the encoding of binary information using the disclosed ternary code sequences.
Figure 1:
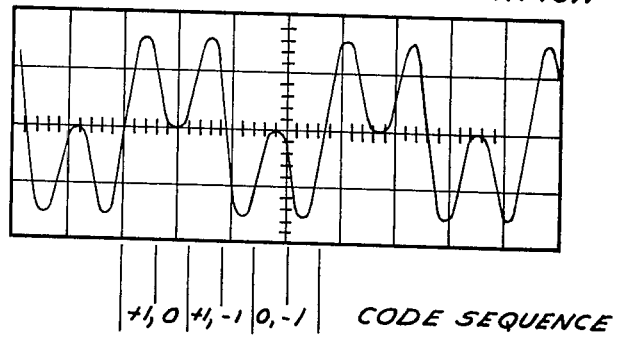
Figure 2:
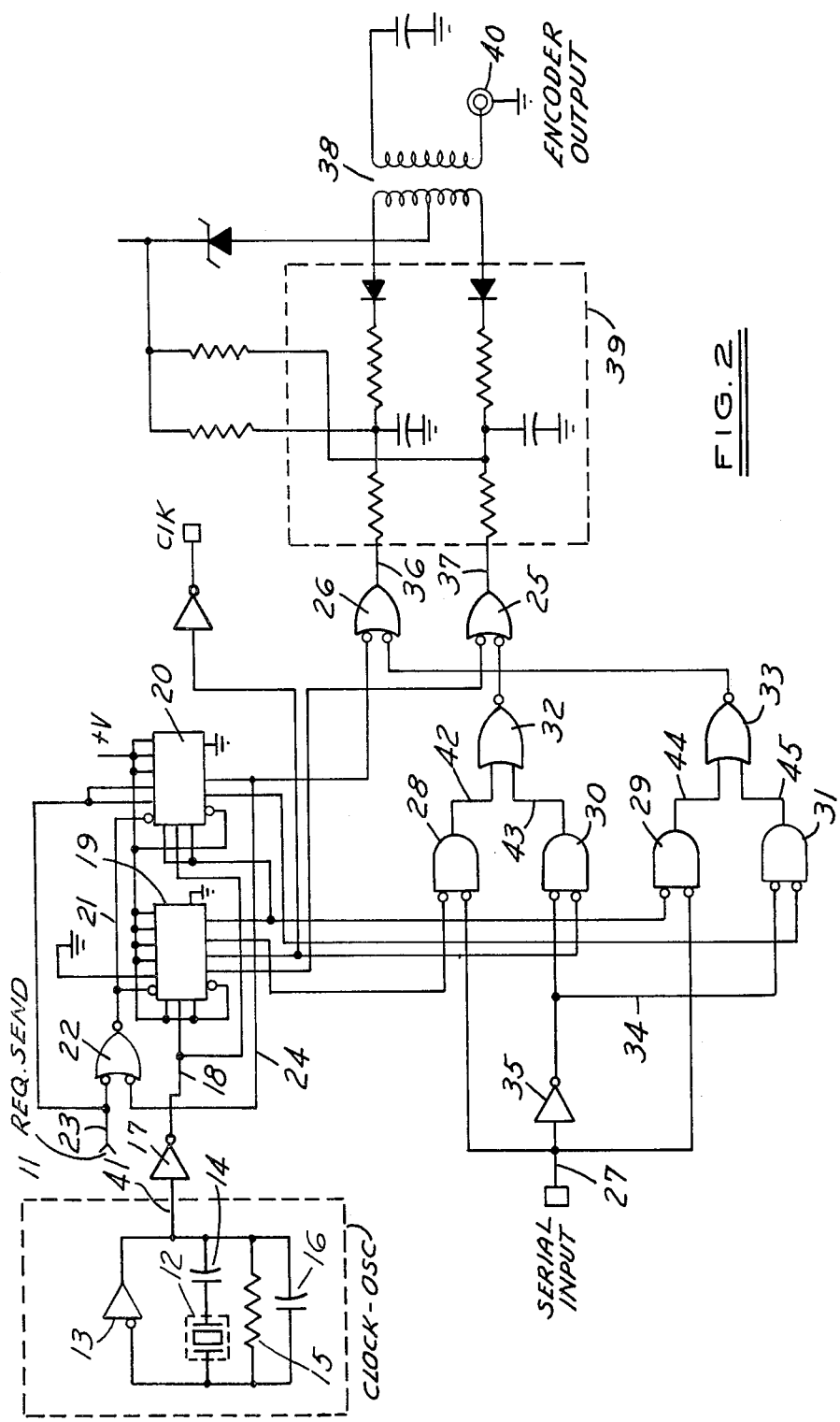
FIG. 2 is a diagram using conventional integrated circuits to illustrate one possible implementation of the ternary code sequence encoder.

FIG. 1 illustrates the signal waveforms for encoding of binary information by two ternary code sequences. The illustrated encoded signal has been waveform integrated to reduce the high frequency spectral components. FIG. 2 shows one selected implementation of an encoder for generating the ternary code sequences based on conventional integrated circuit devices. This implementation is concerned with a binary information encoder whose input format is either a "zero" or "one" state. The encoded output signal of a canonical "zero" form is represented by the sequence +1,0,+1,−1,0,−1 and a "one" is represented by the sequence +1,+1,0,0,−1,−1.

The use of such a code can (1) be used to provide timing by using the transition between the plus to minus of the ternary code, (2) provides a carrier detect signal by integrating the energy content within the code signal, (3) avoids repetition of the same code element so that the lowest frequency is dependent on the rate of transmission of the code and not the length of an information "string", (e.g., all binary elements of one type), (4) summing over the period of either a canonical "one" or "zero" is zero, (5) the energy content within the canonical "zero" and "one" is equal because the number of "1's" and "0's" in the canonical "one" and "zero" are equal, and (6) conditions (4) and (5) are substantially satisfied when the encoded signal is waveform integrated to reduce high frequency spectral components.

Referring to FIG. 2, a clock oscillator section 11 of the transmitter generates all the timing for the encoder. The clock section 11 consists of a crystal 12, buffer amplifier 13 and a "RC" network 14, 15, 16. The output 41 from the oscillator 11 is buffered by a TTL logic inverter 17 for use as a circuit timing signal clock (on line 18). Data encoding is accomplished by performing a logic OR function on information contained on a digital delay line. This delay line consists of two serial 4-bit shift registers 19, 20 which are preset by the output signal (on line 21) from gate 22. The shift registers 19, 20 are held in a preset mode until the request-to-send signal 23 and the output signal 24 of the sixth bit of the delay line from register 20 are both high. Upon release of the preset signal (on line 12) a "zero" bit is shifted sequentially through registers 19, 20. The positive portion (+1,0) of the ternary sequence is generated by gate 25 which performs the logic "OR" function of the tap delay lines from registers 19, 20. Likewise, the negative portion (−1,0) of the ternary sequence is generated by gate 26. The serial input signal (on line 27) is used to select the correct group of gates with inputs from the delay line taps to generate the input signals to NAND gate 25, 26. If the serial input (on line 27) is a "zero" then NOR gates 30, 31, which are selected by output signal (on line 34) from inverter 35 are used to generate the sequence when the serial input (on line 27) is a "one". The outputs (on line 42, 43) from NOR gates 28, 30 are "OR" together by gate 32 to trigger the encoding of the positive sequence. Likewise, output signals (on line 44, 45) from NOR gates 29, 31 are "OR" by gate 33 to trigger the negative encoding of the sequence. The positive output sequence (on line 37) as well as the negative output sequence (on line 36) from gates 25, 26 are coupled to a transformer 38 which generates the ternary output (on line 40). This coupling is through a "RC" integrator circuit 39 which waveform shapes the ternary output signal (on line 40).

A data communication system suitable for use with this invention is further described in a copending application entitled "Communication Broadcast Channel Interface", (Ser. No. 46,578,) filed on even date herewith, assigned to the assignee of this application, the disclosure of which is hereby incorporated by reference.

Various modifications and variations will no doubt occur to those skilled in the various art to which this invention pertains. For example, the particular implementation of the concepts discussed above may be varied from that disclosed herein. The notations +1,0,−1 are used to denote three unique states and need not necessarily correspond to positive, zero and negative voltages. These and all other variations which basically rely on the teachings through which this disclosure has advanced the art are properly considered with the scope of this invention as defined by the appended claims.

We claim:

1. A synchronous data communication transceiver coupled to a communication medium shared by a plurality of other such transceivers and associated with an encoder means for converting a binary input data information code into a ternary output data code capable of supplying timing information, having an average signal value of zero to facilitate AC coupling, and each ternary code sequence having an equal total power transmitted, said encoder means including:
   an input means for receiving binary information in either a first binary state or a second binary state;
   oscillator means for supplying a clock rate which is six times the input rate of the first and second binary states for use in the generation of the ternary code;
   generating means coupled to said input means and said oscillator means for supplying a first and a second pulse train in response to each of the first and second binary input states for use as components in the generating of the ternary code to that in response to the first binary input state said generating means produces a first pulse train of 1, 1, 0, 0, 0, 0 and a second pulse train of 0, 0, 0, 0, 1, 1 and in response to the second binary input state said generating means produces a first pulse train of 1, 0, 1, 0, 0, 0 and a second pulse train of 0, 0, 0, 1, 0, 1; and
   processing means coupled to said generating means for combining the first and second pulse trains so that the ternary code is generated for encoding one binary input data information with +1, +1, 0, 0, −1, −1, and the other binary input data information with +1, 0, +1, −1, 0, −1.

2. A synchronous data communication transceiver and said encoder means as recited in claim 1 wherein:
   said oscillator means includes a crystal means,
   said generating means includes a plurality of logic gates and a delay line having at least one shift register; and
   said processing means includes a push-pull transformer driver for combining the first and second pulse trains so that a signal of magnitude 1 in one of the trains generates a −1 and a signal of magnitude 1 in the other of the pulse trains generates a +1.

* * * * *